United States Patent [19]

Stegenga et al.

[11] 4,135,694

[45] Jan. 23, 1979

[54] PIVOT SUPPORT BRACKET

[75] Inventors: Philip D. Stegenga; Wayne Vandenbrink, both of West Olive, Mich.

[73] Assignee: Donnelly Mirrors, Inc., Holland, Mich.

[21] Appl. No.: 797,022

[22] Filed: May 16, 1977

[51] Int. Cl.² ............................................. B60R 1/02
[52] U.S. Cl. ................................... 248/478; 403/146; 403/162
[58] Field of Search .................... 248/475 B, 478, 479, 248/484; 403/146, 162

[56] References Cited

U.S. PATENT DOCUMENTS

| 1,610,730 | 12/1926 | Baler | 248/161 |
| 1,807,256 | 5/1931 | Ryder | 248/293 |
| 2,676,821 | 4/1954 | Reichelderfer | 403/146 |
| 3,322,388 | 5/1967 | Budreck | 248/475 B |
| 3,346,229 | 10/1967 | Carson | 248/477 |
| 3,544,053 | 12/1970 | Ingalls | 85/50 |

FOREIGN PATENT DOCUMENTS

| 238315 | 3/1960 | Australia | 248/479 |
| 2403621 | 8/1974 | Fed. Rep. of Germany | 248/479 |

Primary Examiner—William H. Schultz
Attorney, Agent, or Firm—Price, Heneveld, Huizenga & Cooper

[57] ABSTRACT

This specification discloses a pivot support bracket for mounting a pivotable member supporting a mirror or the like. The bracket includes a base having an integral flange for strengthening and rigidifying the base and partially covering a coupling including a pivot axle between the base and the pivotable member. Further, the pivot axle serves both as the axis of rotation of the pivotable member and, together with a spring, as a structure for applying a constant, preset, externally nonadjustable biasing force against detent means which rotationally stabilize and resist rotation of the pivotable member with respect to the base. Applying a pivoting force above a certain magnitude to the pivotable member overcomes the biasing force and permits rotation of the pivotable member with respect to the base.

21 Claims, 7 Drawing Figures

PIVOT SUPPORT BRACKET

BACKGROUND OF THE INVENTION (1) Field of the Invention

This invention relates generally to mounting arrangements for a bracket supporting a mirror or the like; and, more particularly, to a mounting which permits relative pivotal movement of the mounted bracket upon application of a predetermined force.

(2) Prior Art

Pivotal coupling between a vehicle and a side mirror is known and can include the use of spring biased detents. Thus, when a force is applied to the mirror or an arm coupling which is sufficient to overcome the biasing force between the detents preventing rotation, the detents will move relative to one another and permit the mirror to pivot. Apparatus to provide such a mounting has included pivotal couplings which have been relatively complex and relatively expensive to manufacture. Strength requirements have often dictated a need for heavier gauge metal and thus increased cost and fabrication difficulty. The need for a bracket to provide for both pivoting and support has resulted in an apparatus of many connected separate parts. Pivotal brackets have failed in operation because of corrosion of the moving parts and because of the failure of fasteners either to properly adjust the tension on the pivot mounting or properly support the mirror to the vehicle. Indeed, the use of screw-type fasteners makes such a mirror vulnerable to intentional and unintentional misadjustment. Since one of the reasons for providing pivoting is safety, such misadjustment can be a dangerous safety hazard. These are some of the drawbacks this invention overcomes.

SUMMARY OF THE INVENTION

A pivot support means for mounting a mirror bracket, or some other member to be pivotally supported, includes a base which can be attached to a vehicle or other body. An axle extends through an aperture in the base and is rotatable therein in conjunction with a rotation means coupled to the axle. The base and rotation means have cooperating detent means for retaining the base and rotation means in a predetermined rotational position with respect to one another. Biasing means urge the rotation means toward the base to maintain engagement of the detent means and yet permit the detent means to move relative to one another upon application of a sufficiently large predetermined force.

An embodiment of this invention can include flange means integral with and extending from the base and at least partially covering the axle and biasing means, and strengthening and rigidifying the base.

An embodiment of this invention can also include an axle which has fixed, permanently deformed ends to secure therebetween the biasing means, the plate means, the base, and the pivotally supported member. The axle can be used to deflect and compress the biasing means thus providing a predetermined, externally nonadjustable force and nonremovably couple the pivotally supported member to the pivot support means.

The integral flange increases strength of the pivot support bracket without the additional material or fabricating expense of using a heavier gauge material. Further, the extension of the flange around a portion of the axle and biasing means protects these from the effects of weather and other corrosion inducing elements. The simplicity of the design facilitates fabrication and tends to reduce failure of the pivot support bracket during operation. That is, the axle can be nonremovably secured to the pivot bracket so the biasing force can be preset at the place of manufacture, which is typically more desirable than setting the biasing force in the field. Permanent setting of the biasing force prevents misadjustment during subsequent operation. Further, the same axle that compresses the biasing means which applies the preset biasing force also permanently secures the pivotal member to the pivot support bracket thereby simplifying field installation and reducing the chance for subsequent undesirable separation of the pivotal member from the pivot support bracket.

DETAILED DESCRIPTION OF THE INVENTION

Figure 6:
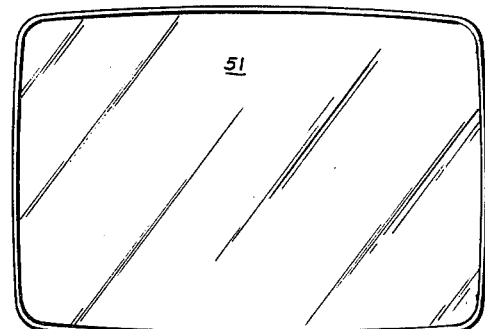
FIG. 6 is a bottom plan view of the pivot support bracket shown in FIGS. 1-5.
Figure 2:
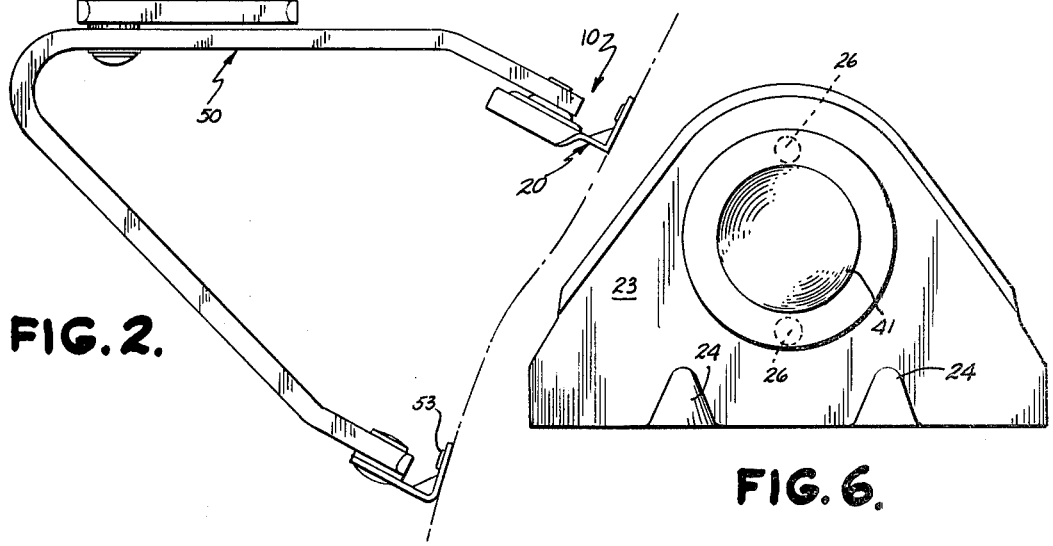
FIG. 2 is a front elevation view of a pivotable mirror assembly with the pivot support bracket shown in a reduced size side elevation view.
Figure 7:
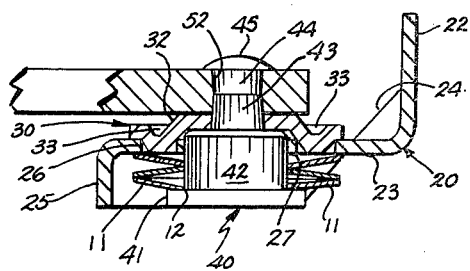
FIG. 7 is a sectional view of the pivot support bracket taken generally along section line VII—VII of FIG. 1.
Figure 4:
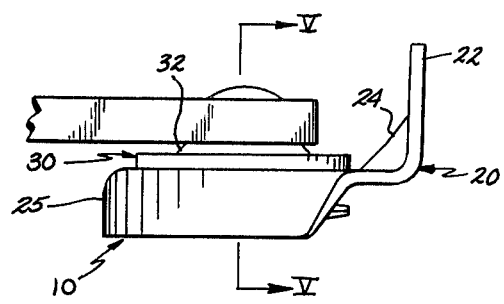
FIG. 4 is an enlarged side elevation view of a pivot support bracket shown attached to a mirror support as in FIG. 2.
Figure 3:
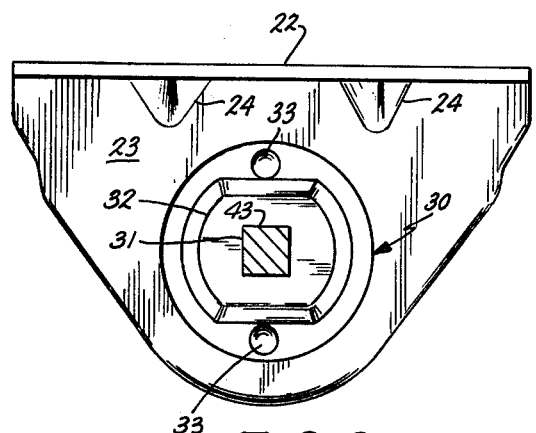
FIG. 3 is a top plan view of the pivot support bracket of FIG. 1 shown partly in section and partially assembled in accordance with an embodiment of this invention.

Referring to FIG. 2, a pivot support bracket 10 includes a base 20 which is coupled to the side of a vehicle and pivotally coupled to the upper leg of a generally C-shaped mirror bracket 50 supporting a mirror 51. A mounting 53 pivotally connects the lower leg of mirror bracket 50 to the vehicle. Base 20 includes a mounting surface 22 extending generally perpendicular to a support surface 23 (FIGS. 1, 3-7). Mounting surface 22 has a generally vertical, rectangular face with a pair of horizontally spaced mounting apertures 21 for passing coupling means such as screws to connect base 20 to a vehicle door, side or the like. Support surface 23 extends generally horizontally outward from the bottom side of mounting surface 22 and tapers to a vertex so it has a generally triangular shape. At the junction of support surface 23 and mounting surface 22 are a pair of reinforcing ribs 24 (FIG. 1) which are angled indentations extending into the corner between mounting surface 22 and support surface 23, opening downwardly and toward the vehicle, and having a top ridge generally at a 45° angle to both the mounting and support surfaces 22 and 23 (FIGS. 4 and 7). Reinforcing ribs 24 help support surface 23 in relation to surface 22 and prevent deflection.

Figure 1:
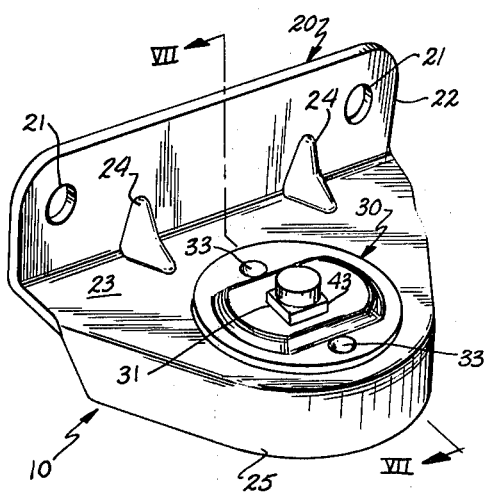
FIG. 1 is a front perspective view of a pivot support bracket in accordance with an embodiment of this invention before coupling to a pivotable member.

Support surface 23 has a pivot aperture 27 (FIGS. 5 and 7) through which is passed a pivot axle 40. A pair of smaller, detent engaging apertures 26 are spaced radially from pivot aperture 27 and circumferentially spaced 180° apart from each other. Engaging apertures 26 are part of detents which keep a circular plate 30 rotationally stabilized with respect to base 20 to resist rotation between the two. An integral flange 25 extends downwardly from support surface 23 and around most of the periphery of support surface 23 not adjacent mounting surface 22 (FIG. 1). As can be seen from FIGS. 4 and 6, flange 25 stops somewhat short of extending to mounting surface 22. Flange 25 provides structural rigidity for support surface 23 and generally strengthens and rigidifies base 20. Thus, the use of flange 25 permits a thinner metal for base 20 to get the same strength than would be required for base 20 without flange 25. Flange 25 also partially shields the underside of support surface 23, pivot axle 40 and its related elements from exposure to weather and other corrosion inducing elements.

The coupling between base 20 and mirror bracket 50 includes plate 30 (FIGS. 3–5) having detents cooperating with base 20, pivot axle 40 and spring washers 11. Plate 30 has a central square coupling aperture 31 (FIGS. 3 and 5) for passing pivot axle 40 and a pair of rounded, protruding detents 33 which are generally circular protrusions radially spaced from coupling aperture 31 and circumferentially spaced 180° from each other and in the same relative position to each other as are engaging apertures 26. The detents 33 are rounded to facilitate camming out of apertures 26 when sufficient rotational force is applied to the bracket. Plate 30 is sized so detents 33 can be received within engaging apertures 26 and the periphery of plate 30 can be contained within the periphery of support surface 23. A relief or raised area 32 in plate 30 is shaped generally rectangularly with curved ends and centered about coupling aperture 31. Relief 32 acts as a reinforcing member in plate 30 by increasing rigidity and resistance to warping.

Figure 5:
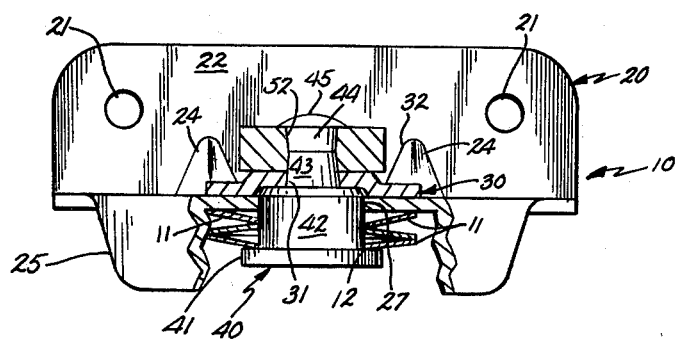
FIG. 5 is a sectional view, of a pivot support bracket taken generally along section line V—V of FIG. 4.

Pivot axle 40 (FIGS. 5 and 7) includes a circular central portion 42 (FIG. 5) having a circumference which fits relatively snugly within a central opening 12 of spring washers 11 but rotationally in pivotal aperture 27. Longitudinally adjacent central portion 42 is a washer support flange 41 having a greater circumference than central portion 42 and of a sufficient diameter to engage spring washers 11. A plate engaging portion 43 extends axially outward from central portion 42 in a direction opposite from washer support flange 41. The radial extension of engaging portion 43 is smaller than the radial extension of central portion 42 so that central portion 42 can fit through pivot aperture 27 and not through coupling aperture 31. Plate engaging portion 43 has a slightly tapered, square cross section designed to fit snugly within coupling aperture 31. As a result, pivot axle 40 and plate 30 can rotate in unison. Mirror bracket 50 also has a slightly tapered coupling aperture 52 (FIGS. 5 and 7) with a generally rectangular shape to receive engaging portion 43. The slight tapers of plate engaging portion 43 and coupling aperture 52 are complementary so there is a noninterference fit during assembly until metal-to-metal contact is reached. Axial pressure can be applied to slightly deform the engaging portions of aperture 52 and portion 43 and obtain a tight, well-matched fit. Thus, mirror bracket 50 is rotationally coupled to pivot axle 40. Extending axially from plate engaging portion 43 is a generally cylindrical deformable portion 44 which passes through coupling aperture 52 and can be deformed into a head 45 (FIG. 5). In a preferred embodiment, after pivot axle 40 is installed and head 45 formed, pivot axle 40 can withstand about 1750 pounds of axial push through force.

In a preferred embodiment, the spring washers 11 are of a type known as a "Belleville" washer which, as illustrated in FIGS. 5 and 7, have a generally frustoconical configuration and are hence arranged in an alternately inverted order. Three Belleville washers are shown, although the number may be varied. The amount spring washers 11 are compressed is determined by the biasing force desired. Spring washers 11 are compressed by drawing axle 40 against them during assembly and head 45 is formed such that the total length of the axle restrains washers 11 as compressed. When detents 33 pivot out of engaging apertures 26 additional force is applied to spring washers 11. Because the camming action of the protrusions 33 moving rotationally to a position atop surface 23 further compresses the washers. Indeed, for mirror bracket 50 to pivot, the force applied to mirror bracket 50 must be sufficient to overcome the biasing force of spring washers 11 holding detents 33 within engaging apertures 26.

ASSEMBLY AND OPERATION

To assemble pivot support bracket 10, spring washers 11 are slipped over pivot axle 40 through apertures 12. Pivot axle 40 with washers 11 on it is inserted through pivotal aperture 27 so washer support flange 41 is below support surface 23 and partially covered by flange 25. Plate 30 is positioned so coupling aperture 41 receives plate engaging portion 43 of pivot axle 40. Coupling aperture 52 of mirror bracket 50 is also positioned on engaging portion 43 of pivot axle 40. Extending above mirror bracket 50 is deformable portion 44 which is deformed into head 45 so the distance along pivot axle 40 between head 45 and washer support flange 41 is sufficiently short to compress washers 11 to the desired degree and produce a biasing force. Thus, for plate 30 to rotate relative to base 20, the biasing force must be overcome so detents 33 can be cammed out of engaging apertures 26. In an example of an embodiment of this invention, the force needed to be applied to pivot support bracket 10 to remove, or break out, detents 33 from engaging apertures 26 is about 145 to 230 inch pounds. After detents 33 are cammed out of engaging apertures 26, the force required to pivot mirror bracket 50 drops and can be less than 96 inch pounds.

When support bracket 10 is assembled, base 20 is connected to a vehicle door or the like by means such as screws through mounting apertures 21. The other end of mirror bracket 50 is mounted to the vehicle by mounting 53 so rotation can take place. Mounting 53 need not be a pivot resisting coupling such as pivot support bracket 10. Use of pivot axle 40 with a deformable portion 44 insures factory adjustment of the proper biasing force on washers 11 and also permanently mounts mirror bracket 50 to pivot support bracket 10. This is simply done using relatively few parts and provides for use of pivot support bracket 10 without the possibility of accidental or intentional misadjustment of a biasing force or removal of bracket 50 from pivot support bracket 10.

Various modifications and variations will no doubt occur to those skilled in the art to which this invention pertains. For example, the number of washers or the particular shape of the mounting bracket may be varied from that disclosed herein. These and all other variations which basically rely on the teachings through which this disclosure has advanced the art are properly considered within the spirit and broader aspects of this invention.

The embodiments of the invention in which an exclusive property or privilege is claimed are defined as follows.

1. A pivot support for mounting a mirror bracket or the like to a vehicle comprising a base with a base aperture therethrough; attaching means for securing said base to a vehicle body or the like; an axle extending through said base aperture and rotatable therein; separately formed rotation means secured to said axle such that they are rotatable in unison with said axle for engaging said base, said rotation means including one surface engaging said base, another surface opposite said one surface for supporting a mirror bracket or the like when secured on said axle and a relieved portion extending away from said one surface for strengthening and rigidifying said rotation means; said axle including an enlarged portion extending through said base aperture and received in said relieved portion and a support flange spaced from said base on said enlarged portion; said base and rotation means including cooperating detent means for retaining said base and rotation means in a predetermined rotational position with respect to one another; means for biasing said rotation means toward and into engagement with said base and for maintaining engagement of said detent means when one end of said axle is secured to a mirror bracket or other member to be pivotally supported, said biasing means including at least one spring washer having a central aperture received over said enlarged axle portion and retained by said support flange for engaging said base around said base aperture a distance beyond said detent means as measured from said axle; and flange means integral with and extending from said base and toward the other end of said axle for at least partially covering said axle and biasing means and strengthening and rigidifying said base.

2. A pivot support as recited in claim 1 wherein said flange means extends from the edge of said base.

3. A pivot support as recited in claim 2 wherein said flange means extends sufficiently far so that said flange means is at least coterminous with said other end of said axle.

4. A pivot support as recited in claim 3 wherein said base is generally triangular and said flange means extends around at least a portion of two sides of said base.

5. A pivot support as recited in claim 4 wherein said flange means is continuous in its extension toward said other end of said axle and in its extension around at least a portion of two sides of said base.

6. A pivot support as recited in claim 1 wherein said spring washer is coupled between the ends of said axle; said axle having permanently deformed ends one of which includes said support flange, rotationally and longitudinally fixed relative to one another, for securing therebetween said spring washer, said rotation means, said base, and said mirror bracket or the like, and for applying a predetermined, fixed force to said spring washer thereby biasing said rotation means toward and into engagement with said base.

7. A pivot support for mounting a mirror bracket or the like to a vehicle comprising a base with a base aperture therethrough; attaching means for securing said base to a vehicle body or the like; an axle extending through said base aperture and rotatable therein; separately formed rotation means secured to said axle such that they are rotatable in unison with said axle for engaging said base, said rotation means including one surface engaging said base and another surface opposite said one surface for supporting a mirror bracket or the like when secured on said axle; said base and rotation means including cooperating detent means for retaining said base and rotation means in a predetermined rotational position with respect to one another; means for biasing said rotation means toward and into engagement with said base and for maintaining engagement of said detent means when one end of said axle is secured to a mirror bracket or other member to be pivotally supported; and flange means integral with and extending from said base and toward the other end of said axle for at least partially covering said axle and biasing means and strengthening and rigidifying said base;

said means for biasing said rotation means including at least one spring coupled between the ends of said axle; and said axle having permanently deformed ends which are rotationally and longitudinally fixed relative to one another, for securing therebetween said spring, said rotation means, said base, and said mirror bracket or other member to be pivotally supported, and for applying a predetermined, fixed force to said spring thereby biasing said rotation means toward and into engagement with said base;

said rotation means being a plate member including a central opening having anti-rotation means for preventing rotation of said axle therein; and at least one protrusion in a direction generally perpendicular to a major face of said plate member for acting as part of said detent means.

8. A pivot support as recited in claim 7 wherein said base includes an engaging aperture positioned to receive said one protrusion thereby rotationally stabilizing said plate member with respect to said base.

9. A pivot support for mounting a pivotally supported member such as a mirror bracket to a vehicle comprising a base with a base aperture therethrough; attaching means for securing said base to a vehicle body or the like; an axle extending through said base aperture and rotatable therein; rotation means rotatable in unison with said axle for engaging said base; said base and rotation means including cooperating detent means for retaining said base and rotation means in a predetermined rotational position with respect to one another; means for biasing said rotation means toward and into engagement with said base and for maintaining engagement of said detent means when one of said axle is secured to a mirror bracket or other member to be pivotally supported; and flange means integral with and extending from said base and toward the other end of said axle for at least partially covering said axle and biasing means and strengthening and rigidifying said base;

said means for biasing including at least one spring coupled between the ends of said axle, said axle having permanently deformed ends which are rotationally and longitudinally fixed relative to one another for securing therebetween said spring, said rotation means, said base, and said mirror bracket or other member to be pivotally supported, and for applying a predetermined, fixed force to said spring thereby biasing said rotation means toward and into engagement with said base;

said rotation means being a plate member including a central opening having anti-rotation means for preventing rotation of said axle therein, and at least one protrusion extending in a direction generally perpendicular to a major face of said plate member for acting as part of said detent means; said base including an engaging aperture positioned to receive said one protrusion thereby rotationally stabilizing said plate member with respect to said base; said ends of said axle extending radially outwardly and being of sufficient size to restrain longitudinal movement of said plate member, said base, said spring and said mirror bracket off said axle; said axle being of a sufficient strength to apply a constant biasing force against said spring.

10. A pivot support as recited in claim 9 wherein said axle includes a longitudinal portion having a noncircular cross-sectional area taken generally perpendicular to the axis of rotation of said axle; said anti-rotation means on said plate member central opening including a noncircular cross-sectional area corresponding to and mating with said noncircular area of said axle; the periphery of said axle cross-sectional area engaging said plate member and said mirror bracket thereby rotationally stabilizing said axle, said plate member and said mirror bracket with respect to each other.

11. A pivot support as recited in claim 10 wherein said spring includes a spring washer having a generally frusto-conical shape with a central aperture receiving said axle therethrough.

12. A pivot support means for mounting a mirror bracket or the like to a vehicle comprising a base with an aperture therethrough; attaching means for securing said base to a vehicle body or the like; an elongated pivot axle extending through said base aperture and rotatable therein and having first and second ends; a plate member having a relieved portion for strengthening and rigidifying said plate member and including a surface for engaging and supporting a mirror bracket or the like and an aperture through said relieved portion for receiving said pivot axle; said axle including an enlarged portion extending through said base aperture and received in said relieved portion and a support flange at said second axle end on said enlarged portion; means for causing said pivot axle and plate member to rotate in unison; said base and plate member including cooperating detent means for retaining said base and plate member in a predetermined rotational position with respect to one another; said surface of said relieved area being offset away from said base from said detent means for spacing said mirror bracket or the like from said detent means and base; biasing spring means for applying a force along the axis of said pivot axle including at least one spring washer having a central aperture received over said enlarged axle portion and retained by said support flange, said spring washer engaging said base around said base aperture at distance beyond said detent means as measured from said axle; said first end of said pivot axle being nonrotationally secured through said plate member aperture and through an opening to a mirror bracket or the like; said first and second ends longitudinally securing said spring means, said plate member and said base between said first and second ends; and said first and second ends being longitudinally and rotationally fixed in relation to one another to hold said spring means and bias said plate member toward said base for maintaining engagement of said detent means, whereby said pivot axle and spring means apply a predetermined, externally nonadjustable, biasing force to said plate member and base and permanently couple the mirror bracket or the like to said pivot support means.

13. A pivot support means as recited in claim 12 further comprising:
a flange means integral with and extending from said base toward said second end of said pivot axle for at least partially covering said pivot axle and said spring means and strengthening and rigidifying said base.

14. A pivot support means as recited in claim 13 wherein said plate member includes:
a central opening generally centered in said surface of said relieved portion for nonrotationally receiving said pivot axle; and
at least one protrusion in a direction generally perpendicular to a major face of said plate member for acting as part of said detent means.

15. A pivot support means as recited in claim 14 wherein said base includes an engaging aperture positioned to receive said one protrusion thereby preventing rotation by rotationally stabilizing said plate member with respect to said base when said biasing force is sufficient to engage said detent means.

16. A pivot support means for mounting a mirror bracket or the like to a vehicle comprising a base with an aperture therethrough; attaching means for securing said base to a vehicle body or the like; an elongated pivot axle extending through said base aperture and rotatable therein and having first and second ends; a plate member having an aperture therethrough for receiving said pivot axle; means for causing said pivot axle and plate member to rotate in unison; said base and plate member including cooperating detent means for retaining said base and plate member in a predetermined rotational position with respect to one another; biasing spring means for applying a force along the axis of said pivot axle; said first end of said pivot axle being nonrotationally secured through an opening to a mirror bracket or the like; said first and second ends longitudinally securing said spring means, said plate member and said base between said first and second ends; and said first and second ends being longitudinally and rotationally fixed in relation to one another to hold said spring means and bias said plate member toward said base for maintaining engagement of said detent means, whereby said pivot axle and spring means apply a predetermined, externally nonadjustable biasing force to said plate member and base and permanently couple the mirror bracket or the like to said pivot support means;
a flange means integral with said extending from said base toward said second end of said pivot axle for at least partially covering said pivot axle and said spring means and strengthening and rigidifying said base;
said plate member including a central opening for nonrotationally receiving said pivot axle, and at least one protrusion extending in a direction generally perpendicular to a major face of said plate member for acting as part of said detent means;
said base including an engaging aperture positioned to receive said one protrusion thereby preventing rotation by rotationally stabilizing said plate member with respect to said base when said biasing force is sufficient to engage said detent means;
said ends of said pivot axle extending radially outwardly and being of sufficient size to restrain longitudinal movement of said plate member, said base, said spring means and said mirror bracket or the like off said pivot axle; said pivot axle being of a sufficient strength to compress and deflect said spring means thereby establishing a constant, externally nonadjustable biasing force.

17. A pivot support means as recited in claim 16 wherein said pivot axle includes a longitudinal portion having a noncircular cross-section area taken generally perpendicular to the axis of rotation of said pivot axle, the periphery of said cross-section area engaging said plate member and said mirror bracket or the like thereby rotationally stabilizing said pivot axle, said plate means and said mirror bracket or the like with respect to each other.

18. A pivot support means as recited in claim 17 wherein said spring means includes a spring washer having a generally frusto-conical shape with a central aperture receiving said pivot axle therethrough.

19. A pivot support means as recited in claim 12 wherein said first and second ends of said pivot axle have a sufficient radial extension to restrain longitudinal movement of said plate member, said base, said spring means, and said mirror bracket off said pivot axle.

20. A pivot support means for mounting a mirror bracket or the like to a vehicle comprising a base with an aperture therethrough; attaching means for securing said base to a vehicle body or the like; an elongated pivot axle extending through said base aperture and rotatable therein and having first and second ends; a plate member having an aperture therethrough for receiving said pivot axle; means for causing said pivot axle and plate member to rotate in unison; said base and plate member including cooperating detent means for retaining said base and plate member in a predetermined rotational position with respect to one another; biasing spring means for applying a force along the axis of said pivot axle; said first end of said pivot axle being nonrotationally secured through an opening to a mirror bracket or the like; said first and second ends longitudinally securing said spring means, said plate member and said base between said first and second ends; and said first and second ends being longitudinally and rotationally fixed in relation to one another to hold said spring means and bias said plate member toward said base for maintaining engagement of said detent means, whereby said pivot axle and spring means apply a predetermined, externally nonadjustable biasing force to said plate member and base and permanently couple the mirror bracket or the like to said pivot support means; said first and second ends of said pivot axle having a sufficient radial extension to restrain longitudinal movement of said plate member, said base, said spring means, and said mirror bracket off said pivot axle; said pivot axle including a first longitudinal portion intermediate said first and second ends, said first longitudinal portion having a radial extension sufficiently small to pass through said base aperture and sufficiently large not to pass through said plate member aperture; and said pivot axle including a second longitudinal portion positioned between said first longitudinal portion and said first end, said second longitudinal portion having a sufficiently small radial extension to fit within said mirror bracket opening.

21. A pivot support means as recited in claim 20 wherein said second longitudinal portion has a noncircular circumference tapering in radial extension with increasing distance along at least a portion of its length toward said first end.

* * * * *